US00H002157H

(19) United States
(12) Statutory Invention Registration
Aprigliano et al.

(10) Reg. No.: US H2157 H
(43) Published: Jun. 6, 2006

(54) METHOD OF PRODUCING CORROSION RESISTANT METAL ALLOYS WITH IMPROVED STRENGTH AND DUCTILITY

(75) Inventors: Louis F. Aprigliano, Berlin, MD (US); Leslie K. Kohler, Boyds, MD (US)

(73) Assignee: The United States of America as represented by the Secretary of the Navy, Washington, DC (US)

(21) Appl. No.: 09/656,017

(22) Filed: Sep. 7, 2000

Related U.S. Application Data

(63) Continuation-in-part of application No. 09/233,907, filed on Jan. 21, 1999, now abandoned.

(51) Int. Cl.
*B22D 23/00* (2006.01)

(52) U.S. Cl. ..... 164/46
(58) Field of Classification Search ..... 164/46
See application file for complete search history.

(56) References Cited

U.S. PATENT DOCUMENTS

| | | | | | |
|---|---|---|---|---|---|
| 3,607,343 | A | * | 9/1971 | Longo et al. | 548/210 |
| 3,635,769 | A | * | 1/1972 | Shaw | 148/32 |
| 4,117,209 | A | | 9/1978 | Markin et al. | |
| RE31,767 | E | | 12/1984 | Brooks | |
| 4,606,948 | A | | 8/1986 | Hajmrle et al. | |
| 4,681,258 | A | * | 7/1987 | Jenkins et al. | 239/66 |
| 4,779,802 | A | | 10/1988 | Coombs | |
| 4,977,950 | A | | 12/1990 | Muench | |
| 5,017,250 | A | | 5/1991 | Ashok | |
| 5,154,219 | A | | 10/1992 | Watson et al. | |
| 5,213,848 | A | * | 5/1993 | Zurecki et al. | 427/449 |
| 5,489,417 | A | | 2/1996 | Watson et al. | |
| 5,843,587 | A | | 12/1998 | Nakamori et al. | |

FOREIGN PATENT DOCUMENTS

JP 63-33594 * 2/1988

* cited by examiner

*Primary Examiner*—Aileen Felton
(74) *Attorney, Agent, or Firm*—Jacob Shuster

(57) ABSTRACT

Nickel and chromium as the exclusive components of an alloy is formed by mixing under cover of nitrogen gas and spray casting thereof wherein a molten outflow stream of such alloy components is atomized by exposure to jets of the nitrogen gas after pressurization, resulting in formation of molten alloy metal droplets deposited on to a surface.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

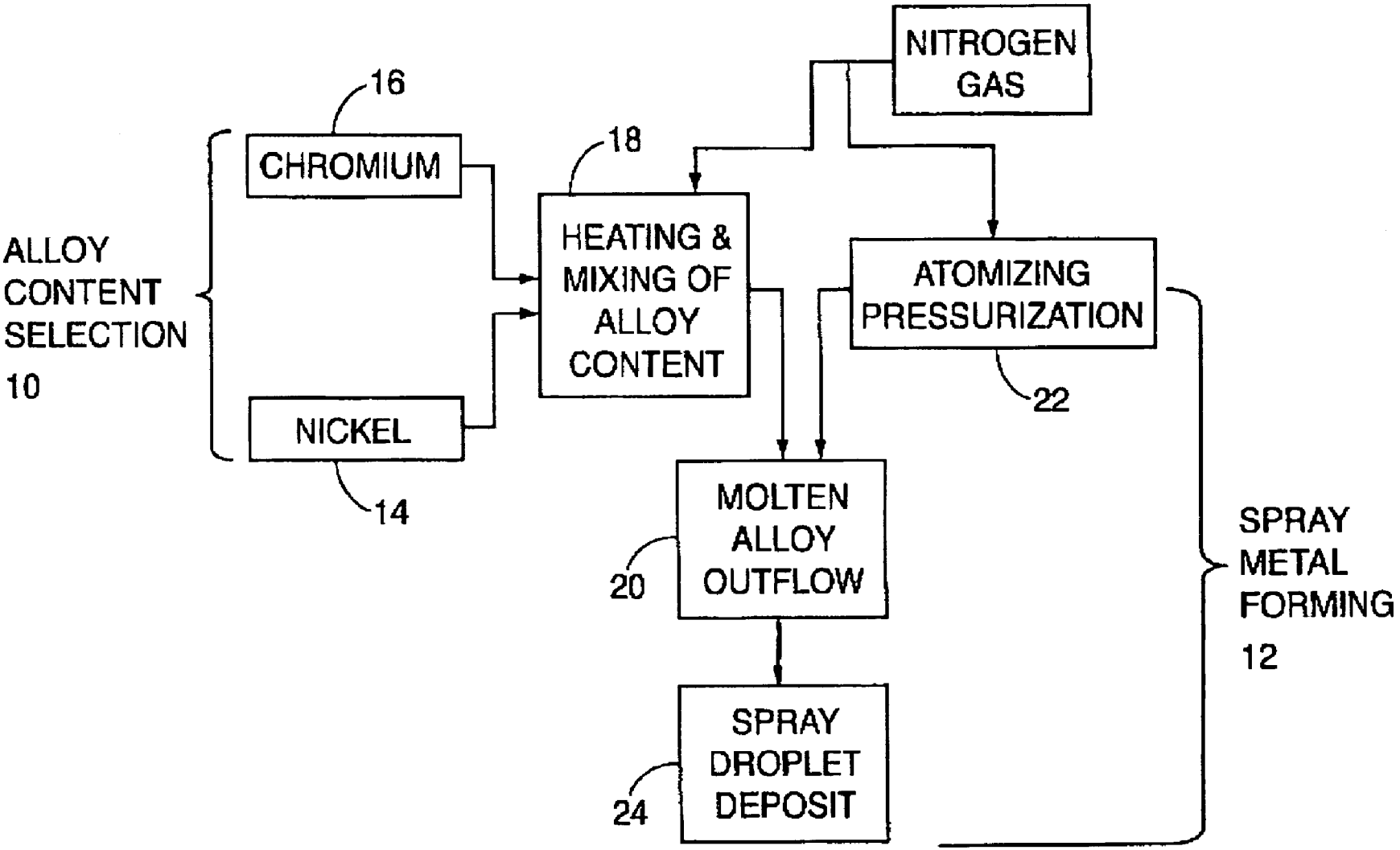
SPRAY METAL FORMING 12
NITROGEN GAS
ATOMIZING PRESSURIZATION
22
MOLTEN ALLOY OUTFLOW
SPRAY DROPLET DEPOSIT
20
24
18
HEATING & MIXING OF ALLOY CONTENT
16
CHROMIUM
NICKEL
14
ALLOY CONTENT SELECTION 10

METHOD OF PRODUCING CORROSION RESISTANT METAL ALLOYS WITH IMPROVED STRENGTH AND DUCTILITY

The present invention relates generally to the formation of a metal alloy having desirable properties in addition to ductility, despite the presence of a high content of chromium therein and is a continuation-in-part of the disclosure in prior copending application Ser. No. 09/233,907, filed Jan. 21, 1999, now abandoned.

BACKGROUND OF THE INVENTION

Nickel-chromium alloys with chromium contents of 40% by weight or more have extremely low ductility. An improvement in both strength and ductility by casting of such high chromium content alloys was totally unexpected.

The use of spray casting in the formation of metal alloys having a low chromium content is generally well known. Such process involves the use of an atomizing gas to which the molten alloy is exposed as disclosed for example in U.S. Pat. Nos. 4,117,209, 4,606,948, 4,977,950, 5,017,250, 5,154,219, 5,489,417 and Re. 31,767, respectively issued to Markin et al., Hajmrle et al., Muench, Ashok, Watson et al., (2), and Brooks. U.S. Pat. No. 4,779,802 to Coombs is of interest in regard to spray forming atomization. Only the foregoing referred to Markin et al. and Hajmrle patents also relate to use of the spray casting process for nickel-chromium types of alloys, expressly limited to low content chromium of 20% by weight or less. The production of Nickel-chromium alloy is also disclosed in U.S. Pat. No. 5,843,587 to Nakamori for use as a gas turbine blade coating without regard to increasing alloy strength. The spray casting process was not heretofore expected to produce a metallic nickel type of alloy having the advantage of high ductility in connection with a high chromium content in excess of 40% by weight.

It is therefore an important object of the present invention to provide a method for producing a metallic alloy with a high chromium content, having an increase in both strength and ductility despite the normally expected presence of brittleness associated with high chromium content alloys.

SUMMARY OF THE INVENTION

In accordance with the present invention, a spray metal forming process is utilized to produce an alloy, wherein the alloy components are melted and mixed under cover of an inert gas and allowed to form a molten metal outflow stream that is atomized into a fine spray of molten droplets directed onto a moving or stationary surface. The alloy components are selected and exclusively limited to nickel and chromium, respectively constituting between 48% and 52% by weight of the alloy while nitrogen is selected as the inert cover gas. The referred to atomization of the outflow stream of molten metal is effected by jets of the nitrogen gas pressurized for rapid surface deposit of the molten droplets having a very fine and uniform grain structure. A ductile matrix is thereby created in the deposited alloy with a fine dispersion of brittle phases in the formation of chromium nitrides resulting from mixing of the alloy components under cover of nitrogen as a crucial selection of the inert cover gas and exposure of the molten alloy outflow stream to such nitrogen gas pressurized for atomization purposes. Improvement in ductility, as well as a boost in strength of the ductile matrix was successfully achieved as a result of the selection of nitrogen as compared to argon as the inert cover gas.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein:

The drawing is a block diagram schematically illustrating the alloy forming process of the present invention.

DETAILED DESCRIPTION OF PREFERRED EMBODIMENT

Referring now to the drawing, the method or process of producing an alloy composed exclusively of nickel and chromium in accordance with the present invention is diagrammed. Such method involves alloy content selection 10, pursuant to the present invention, in association with a spray metal casting or forming process 12 generally known in the art. As indicated in the block diagram, alloy content selection 10 involves use of between 48% and 52% by weight as the nickel content 14 and 52% to 48% by weight as the chromium content 16. Such alloy components initially undergo heating 18, within a receptacle such as a crucible, under cover of nitrogen selected as the inert cover has in order to melt the nickel and chromium and allow an outflow 20 of a stream of molten alloy metal from the bottom of the crucible, as part of the diagrammed spray metal forming process 12. The nitrogen gas is also pressurized as denoted by reference numeral 22 and introduced as jets into the molten metal outflow 20 so as to atomize the outflow stream and break it up into a fine spray of molten metal droplets. Such molten droplets or particles undergo deposit 24, by direction onto a rotating or stationary mandrel surface for example, resulting in billets or shapes having a very fine and uniform grain structure.

The foregoing described method was utilized to deposit fifty (50) pounds of alloy of 50% by weight of nickel and 50% by weight of chromium within a minute. The alloy so produced had a yield strength of 145 ksi and tensile elongation of 25% or greater. The exposure to the nitrogen gas during heating of the alloy content and its atomization by such nitrogen gas during the spray metal forming process 12 created a high strength ductile alloy matrix with a substantially eutectic and fine grain structure of 100 micrometers or less in average grain size as well as a uniform microstructure. Also because of the fine chromium nitrides formed by such exposure to the atomizing nitrogen gas, a boost in alloy strength occurred.

The alloy fabrication method hereinbefore described may be beneficial in the formation of any alloy that is normally brittle due to the presence of TCP phases, by virture of the fine dispersion of such phases within the ductile matrix.

Obviously, other modifications and variations of the present invention may be possible in light of the foregoing teachings. It is therefore to be understood that within the scope of the appended claims the invention may be practiced otherwise than as specifically described.

What is claimed is:

1. In a method of casting a ductile alloy having a base metal by heating thereof to produce a molten stream that is atomized into a spray of droplets directed onto a moving substrate surface; the improvement residing in: selecting a corrosion resisting material as a component of the alloy undergoing said heating; exclusively limiting said alloy to the base metal and the corrosion resisting material; and utilizing an inert cover gas to atomize the molten stream into said spray of droplets for deposit onto said surface to increase in strength the ductile alloy from a yield strength of less than 145 ksi.

2. The method as defined in claim 1, wherein said base metal is nickel, the corrosion resisting material is chromium and the inert cover gas is nitrogen selected to effect said increase in strength of the ductile alloy with ductility improved from less than 25% tensile elongation.

3. In a method of coating a surface with a ductile alloy; the improvement residing in: casting onto said surface a molten stream exclusively limited to: a corrosion-resisting material constituting between 48% and 52% of the ductile alloy undergoing heating during said casting for increase in strength thereof and a base metal; and selecting an inert cover gas to atomize the molten stream into a spray of droplets for deposit onto the surface thereby effecting said increase in strength of the ductile alloy during said casting from a yield strength of less than 145 ksi.

* * * * *